Aug. 22, 1939.  A. E. DETWILER  2,170,013
SHELF
Filed July 7, 1938   2 Sheets-Sheet 1
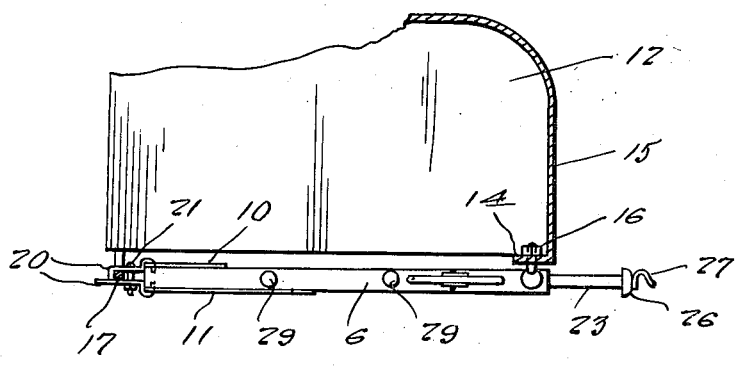
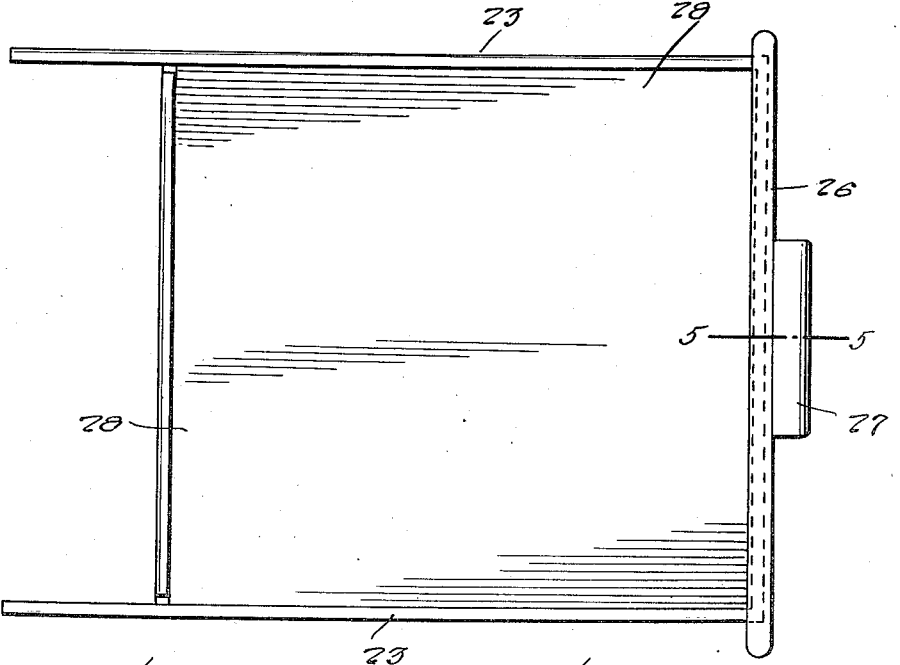
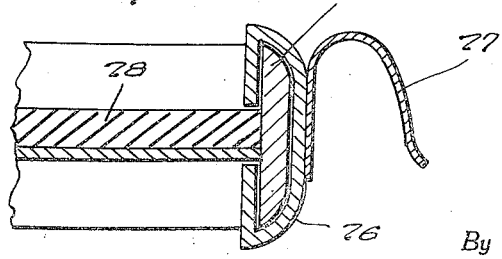
Inventor
A. E. Detwiler Aug. 22, 1939.  A. E. DETWILER  2,170,013
SHELF
Filed July 7, 1938  2 Sheets-Sheet 2
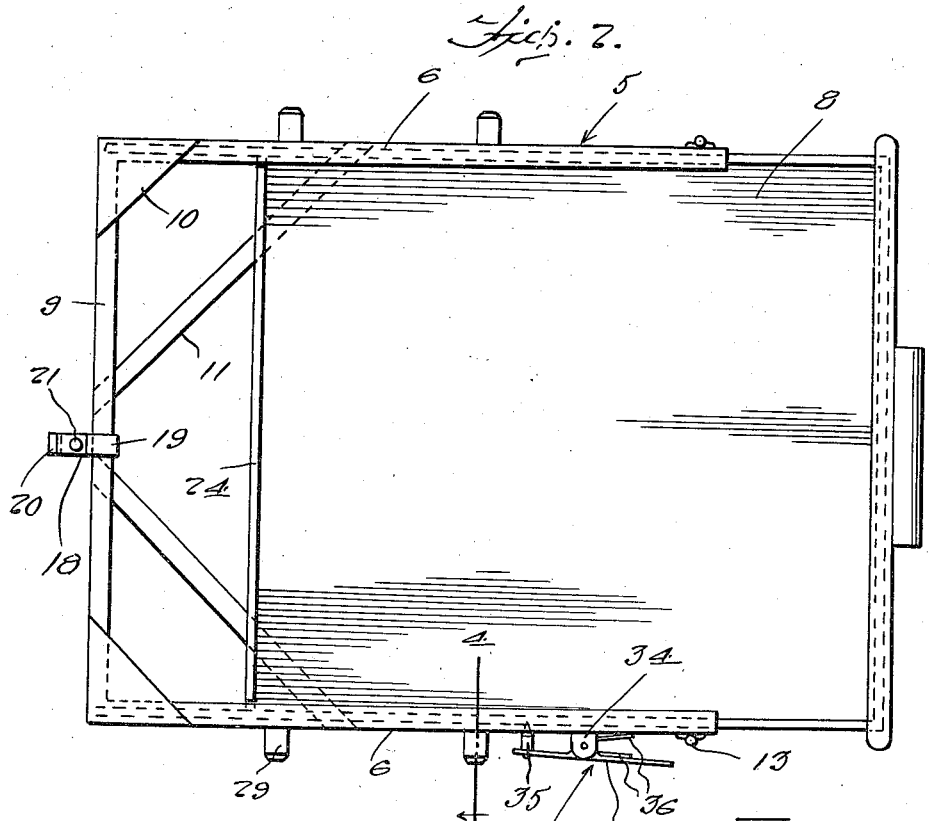
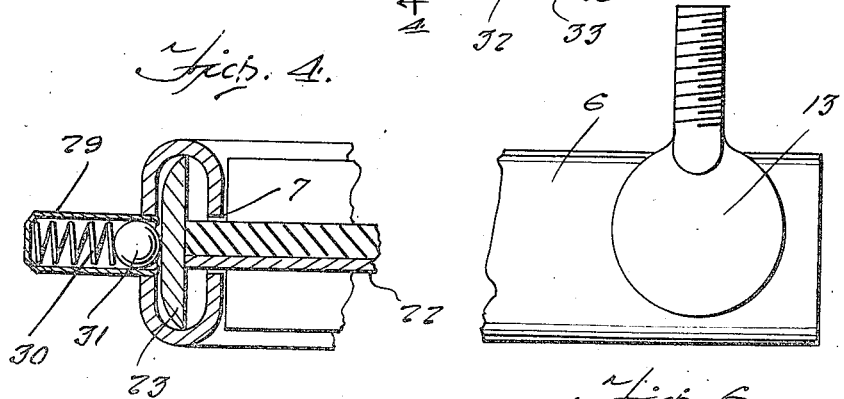
Inventor
A. E. Detwiler
By Clarence A. O'Brien
and Hyman Berman
Attorneys Patented Aug. 22, 1939

2,170,013

UNITED STATES PATENT OFFICE 2,170,013

SHELF

Angus E. Detwiler, Miami, Fla.

Application July 7, 1938, Serial No. 217,984

1 Claim. (Cl. 311—21)

This invention relates to shelves and an object of the invention is to provide a shelf which may be readily mounted interiorly of the automobile to serve as a support for dishes and the like when partaking of a meal or refreshments, and also as a table or desk for writing purposes or the like.

An object of the invention is to provide a shelf of this character which may be readily and quickly mounted within the body of the automobile and which when not in use will be substantially out of sight and inconspicuous.

The invention together with its objects and advantages will be best understood from a study of the following description taken in connection with the accompanying drawings wherein:

Figure 1 is a fragmentary detail view partly in section and partly in elevation showing the manner of mounting the shelf beneath the glove compartment of an automobile, Figure 2 is a top plan view of the shelf, Figure 3 is a top plan view of the sliding shelf member, Figure 4 is a detail sectional view taken substantially on the line 4—4 of Figure 2, Figure 5 is a detail sectional view taken substantially on the line 5—5 of Figure 3, and Figure 6 is a fragmentary detail elevational view illustrating certain details of construction hereinafter more specifically referred to.

Referring to the drawings in detail it will be seen that in accordance with the invention, the preferred embodiment thereof comprises a substantially U-shaped frame 5 the sides 6 of which as clearly shown in Figure 4 are hollow and are provided at the inner faces thereof with slots 7 to accommodate a sliding shelf member 8.

At the closed end of the frame the sides 6 and end member 9 of the frame are braced through the medium of brace plates 10 and diagonal braces 11.

The frame 5 is preferably secured beneath the glove compartment 12 of the automobile as shown in Figure 1 and to that end the side members 6 of the frame at the open ends of the U are provided with threaded studs 13 that are accommodated within openings provided therefor in the flange 14 of the instrument board 15 of the automobile and are equipped with nuts 16 as shown in Figure 1.

As is well-known there is generally provided at the rear of the glove compartment a transverse brace rod 17 and for supporting the inner end 9 of the frame there is provided a two-part clamp 18, the parts or sections of which at one end are provided with complemental jaws 19 that clamp therebetween the end rail 9 of the frame while at the opposite end thereof the parts or sections of the clamp are provided with complemental jaws 20 that clamp therebetween the brace rail 17 as also clearly shown in Figure 1. The sections or parts of the clamp are secured together through the medium of a suitable nut-equipped bolt 21.

The sliding shelf proper, indicated by the reference numeral 8, comprises a bottom plate 22 of metal or other suitable material confined within a rim or frame embodying side rails 23, a rear end rail 24, and a front end rail 25.

The side rails 23 of the shelf are slidably accommodated within the sides 6 of the frame as shown in Figure 4 and on the front end rail 25 is a trim member 26 that corresponds to the side members 6 of frame 5 and forms as it were an end member for the frame 5 at the open end of the U.

To facilitate the sliding of the shelf member 8 relative to the frame 5, the trim 26 is provided with a suitable handle 27.

As will be seen from Figures 4 and 5 the side members 6 of the supporting frame are each of substantially C-shape in cross section with the slot 7 spaced from the top and bottom of the side member and the trim member 26 is of substantially the same shape. The side pieces 23 and the front piece 25 of the sliding shelf are each of considerable width with parts projecting below the plate 22 and other parts extending above the plate with the upper and lower edges of the members 23 having sliding contact with the top and bottom walls of the space formed by the side rails 6, as shown in Figure 4. The arrangement shown in Figure 4 provides a structure which will prevent tilting and locking movement of the shelf in the supporting frame and one which will hold the shelf steady in the supporting frame.

For the bottom plate 22 of the shelf there is provided a covering 28 of Bakelite or other suitable material which gives to the shelf a more finished appearance.

Also, to retain the shelf 8 within the frame somewhat under tension and against rattling, the side members 6 of the frame are provided with laterally extending tubular casings 29 in which are housed springs 30 that serve to project ball-bearings 31 outwardly into frictional contact with the side rails 23 of the sliding shelf as shown in Figure 4.

Also to secure the shelf 8 at the desired position of adjustment relative to the frame 5, there is mounted on one of the side rails 6 of the frame a latch assembly 32 which includes a lever 33 pivoted intermediate its ends to ears 34 extending laterally from said side frame member 6. At one end thereof the lever 33 is provided with a lateral head 35 that has a pointed end or terminal that extends through an opening in said side frame member 6 to bear against a side rail 23 of the shelf 8 for securing the shelf at the desired position of adjustment.

The hinge or pivot connections between the lever 33 and the ears or lugs 34 embody a spring 36 which acts on the lever 33 in a manner to normally urge the head 35 of the lever into locking engagement with the side rails of the shelf 8.

It will thus be seen that by releasing the latch 32 in an obvious manner, shelf 8 may be readily slid outwardly or inwardly with respect to the frame 5 to the desired position of adjustment and will be retained in said position of adjustment upon release of the latch. With the shelf in its inwardmost position, the same will be substantially concealed from view beneath the instrument board of the automobile.

It will also be appreciated that the assembly may be readily mounted bodily within the automobile body and as quickly demounted and removed.

It is thought that a clear understanding of the construction, utility and advantages of an invention of this character will be had without a more detailed description.

Having thus described the invention what is claimed as new is:

A shelf for an automobile comprising a frame including a pair of side members and a rear member, each side member being of hollow construction and having a longitudinally extending slot in the central portion of its inner face, means for supporting the frame under the instrument board of an automobile, a shelf-forming member including side and end members and a plate-like member filling the space between said side and end members and connected with said members, the side members of the shelf-forming member sliding in the side members of the frame with the plate-like member passing through the slots of said side members of the frame, the side members of the shelf-forming member having parts extending above and below the plate-like member and having their upper and lower edges contacting the top and bottom of the spaces formed by the hollow side members of the frame, the front end member of the shelf-forming member being of the same shape as the side members thereof and a trim member fitting over said front end member and having a slot in its inner face through which the front end of the plate-like member passes, said trim member being of substantially the same cross sectional shape as a side member of the frame and a handle connected with the trim member.

ANGUS E. DETWILER.